United States Patent [19]
Usui et al.

[11] Patent Number: 5,978,039
[45] Date of Patent: Nov. 2, 1999

[54] IMAGE CONTROL METHOD AND IMAGE CONTROL APPARATUS CAPABLE OF COMPENSATING FOR DISTURBED TV IMAGE

[75] Inventors: Hirofumi Usui, Tokyo; Naomasa Takahashi, Chiba, both of Japan

[73] Assignee: Sony Corporation, Tokyo, Japan

[21] Appl. No.: 08/755,370

[22] Filed: Nov. 25, 1996

[30] Foreign Application Priority Data

Dec. 21, 1995 [JP] Japan ..................................... 7-333105

[51] Int. Cl.⁶ ........................................................ H04N 5/21
[52] U.S. Cl. ........................... 348/553; 348/607; 348/634
[58] Field of Search .................................... 348/553, 563, 348/567, 568, 607–624, 704, 705, 706, 559, 560, 731, 732, 634, 635, 636, 637; H04N 5/21, 5/213, 5/217

[56] References Cited

U.S. PATENT DOCUMENTS

| | | | |
|---|---|---|---|
| 4,636,864 | 1/1987 | Annegarn | 348/553 |
| 4,774,581 | 9/1988 | Shiratshuchi | 348/553 |
| 4,982,279 | 1/1991 | Ishii | 348/553 |
| 5,107,334 | 4/1992 | Matsumoto | 348/553 |
| 5,193,005 | 3/1993 | Tomita | 348/731 |
| 5,512,958 | 4/1996 | Rzeszewski | 348/607 |
| 5,661,526 | 8/1997 | Hamamoto | 348/6 |
| 5,712,474 | 1/1998 | Naneda | 348/208 |
| 5,742,279 | 4/1998 | Yamamoto | 345/173 |
| 5,815,135 | 9/1998 | Yui | 345/97 |
| 5,835,641 | 11/1998 | Sotoda | 348/240 |

*Primary Examiner*—John K. Peng
*Assistant Examiner*—Wesner Sajous
*Attorney, Agent, or Firm*—Jay H. Maioli

[57] ABSTRACT

In a television equipped with an image control apparatus, when a signal reception condition is deteriorated, a poor image is not displayed on the television screen by reproducing saved image data. The image control apparatus is arranged by a receiver for receiving a signal including image data, a detecting device for detecting disturbance of the; signal received by the receiver, a memory for saving the image data included in the signal received by the receiver, and a display controller for controlling display of the image data on a display unit. That image data saved in the memory is read out on the detecting device detecting the disturbance of the signal and is displayed, while the disturbance of the signal is continued.

16 Claims, 10 Drawing Sheets

IMAGE CONTROL METHOD AND IMAGE CONTROL APPARATUS CAPABLE OF COMPENSATING FOR DISTURBED TV IMAGE

FIELD OF THE INVENTION

The present invention generally relates to an image control method and an image control apparatus. More specifically, the present invention is directed to image control method/apparatus such that when a received signal is disturbed, such image data stored therein are read out, and images of these image data are displayed until signal disturbance disappears.

BACKGROUND OF THE INVENTION

In such a case that an image of a television broadcasting signal received by a tuner is displayed on a display unit separately provided from this tuner, and also this tuner cannot be connected to the display unit, image signals are transmitted from the tuner to the display unit by utilizing electromagnetic waves and infrared rays. In such a case, when an interference object passes through a space between a transmitting position (tuner) and a receiving position (display unit), or interference electromagnetic waves are produced near the tuner and display unit, the following phenomenon will occur. That is, the infrared-ray or electromagnetic wave reception conditions would be deteriorated. In particular, when a signal is received by a moving object while the moving object is traveling through towns and mountainous areas, since signal reception conditions are varied in accordance with the peripheral environments, such a poor reception condition would occur.

Conventionally, even when the signal reception conditions are deteriorated, the demodulating process operation is carried out in a similar manner executed under better signal reception conditions. Thus, the demodulated voice (audio) and pictures are directly outputted.

However, when the signal reception conditions are deteriorated, if the demodulated signal is directly outputted, then the voice and pictures are disturbed. If the voice is disturbed within a certain allowable range, then this disturbed voice does not give such a strong unpleasant feeling. To the contrary, since the picture disturbance is easily sensible, there is such a problem that if the deteriorated signal reception conditions cause even a small amount of a poor picture to be displayed, then this poor picture may give unpleasant feelings to users.

SUMMARY OF THE INVENTION

The present invention has been made to solve the above-described problem, and therefore has an object to provide an image control apparatus, an image control method and also an image control system by which no unpleasant feeling is given to any users as follows. That is, when a received signal is disturbed while monitoring a signal reception condition, saved image data is read so as to display an image of this read image data until this image disturbance disappears, so that poor pictures caused by this signal disturbance are not displayed.

To achieve the above object, an image control apparatus according to the present invention comprises receiving means for receiving a signal including image data; detecting means for detecting disturbance of the signal received by said receiving means; saving means for saving the image data included in the signal received by the receiving means; and display control means for controlling display of the image data on a display unit so that the image data saved in the saving means is read out on the detecting means detecting the disturbance of the signal and is displayed while the disturbance of the signal is continued.

The object can be also achieved by an image control method according to the present invention which comprises the steps of receiving a signal including image data; sequentially saving the image data included in the signal received; sequentially reading out after a predetermined time has passed the image data saved, with disturbance of the signal received being detected; and displaying the image data. The step of displaying is controlled so that, when the disturbance of the signal is detected, the image data saved is read out and displayed at a predetermined displaying speed while the disturbance of the signal is continued.

Further, the object can be achieved by an image control system according to the present invention which comprises transmitting means for transmitting a signal including image data; receiving means for receiving the signal transmitted from the transmitting means; detecting means for detecting disturbance of the signal received by the receiving means; saving means for saving the image data included in the signal received by the receiving means; and display control means for controlling display of the image data on a display unit so that the image data saved in the saving means is read out on the detecting means detecting the disturbance of the signal and is displayed while the disturbance of the signal is continued.

BRIEF DESCRIPTION OF THE DRAWINGS

For a complete understanding of the present invention, reference is made of detailed descriptions to be read in conjunction with accompanying drawings, in which.

DETAILED DESCRIPTION OF THE PREFERRED EMBODIMENTS

Figure 1:
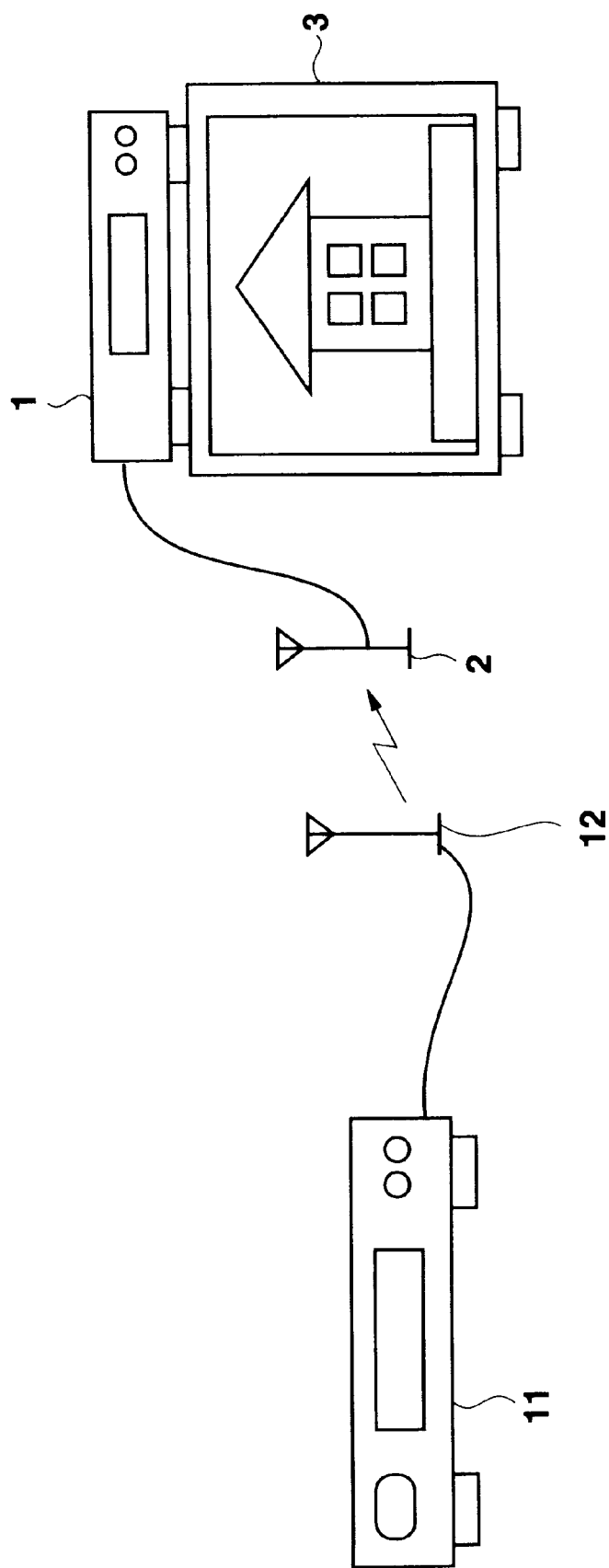
FIG. 1 schematically indicates a connection example of an image control apparatus according to an embodiment of the present invention.

FIG. 1 schematically represents a system including a connection example of an image control apparatus according to an embodiment of the present invention. An image control apparatus 1 shown in FIG. 1 is arranged to receive a picture (video) signal and an audio (voice) signal via a receiver antenna 2. These picture and audio signals are reproduced by a video reproducing apparatus 11 and transmitted through a transmitter antenna 12 in electromagnetic wave forms.

The image control apparatus 1 is so designed that a received television signal is displayed on a television (TV) 3, and A/D-converted into digital video data, and then this digital video data is compressed. The compressed video data is stored. When the receiving conditions of the electromagnetic waves are deteriorated, the saved video data is expanded so as to be returned to the analog video signal which will then be displayed on the television 3.

It should be understood that although the picture signal and the audio signal are transmitted in the form of an electromagnetic wave in this embodiment, infrared rays (IR) may be utilized for the signal transmission instead of the electromagnetic wave. In this alternative case, an IR transmitter element and an IR receiver element may be employed instead of the transmitter antenna 12, and the receiver antenna 2, respectively.

Figure 2:
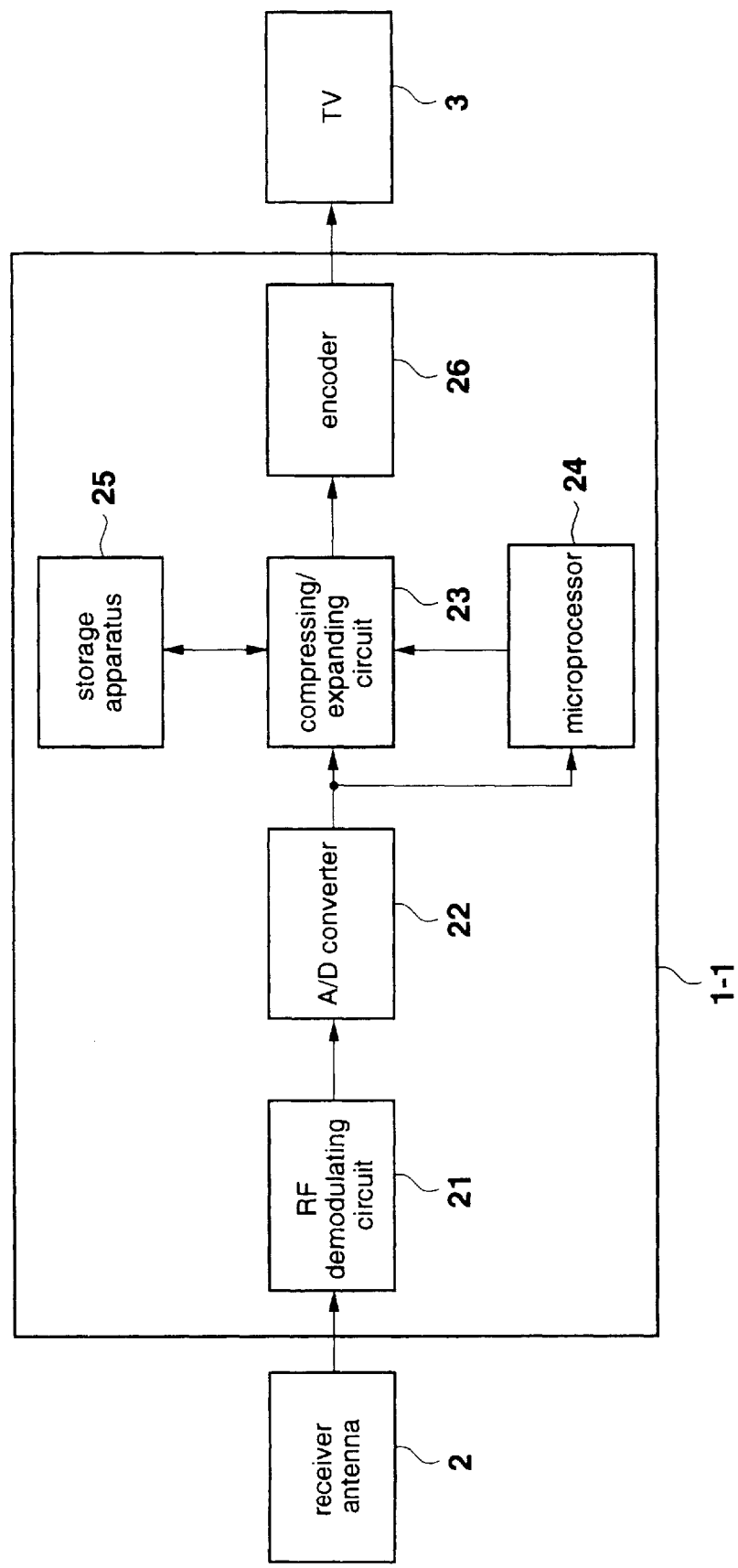
FIG. 2 is a schematic block for representing an arrangement of an image control apparatus according to a first embodiment of the present invention.

FIG. 2 schematically indicates an arrangement of an image control apparatus according to a first embodiment of the present invention. In this first embodiment, an RF (Radio Frequency) demodulating circuit (receiving means) 21 demodulates electromagnetic waves received via a receiver antenna 2 and outputs the demodulated signal (analog video signal) to an A/D converter 22.

The A/D converter 22 A/D-converts the analog video signal derived from the RF demodulating circuit 21 into a digital video signal, and then supplies this digital video signal to a compressing/expanding circuit (display control means) 23 and a microprocessor (detecting means) 24.

The compressing/expanding circuit 23 compresses the digital video signal containing image data and audio (voice) data, derived from the A/D converter 22, and thereafter saves the compressed digital video signal into a storage apparatus (saving means) 25 such as a hard disk and an MO (Magneto-Optical) disk. Then, the compressing/expanding circuit 23 reads the data from the storage apparatus 25 into which this data has been saved for predetermined time to thereby expand this read data. Thereafter, the compressing/expanding circuit 23 outputs the expanded data to an encoder 26.

The encoder 26 converts the digital video signal derived from the compressing/expanding circuit 23 into an NTSC type analog video signal which will then be outputted to the TV 3.

A microprocessor 24 extracts image data from the digital video signal supplied from the A/D converter 22 and calculates a correlation coefficient of pixel values contained in the image data in one line and another line subsequent to the first-mentioned line. When the value of this correlation coefficient is not larger than, or equal to a predetermined threshold value, the microprocessor 24 judges that the image of this image data is disturbed.

When it is judged that the image is disturbed, the microprocessor 24 interrupts the compression/saving operations of the digital video signal by the compressing/expanding circuit 23 until such a judgment is made that the image disturbance disappears.

It should be noted that while the compressing/saving operations of the digital video signal are interrupted, the compressing/expanding circuit 23 reads digital video data which have not yet been displayed among the digital video data saved in the storage apparatus 25, in a preselected time interval longer than the time interval under normal condition (namely, under better signal reception condition). Then, the microprocessor 24 outputs the read digital video data to the encoder 26.

Figure 3:
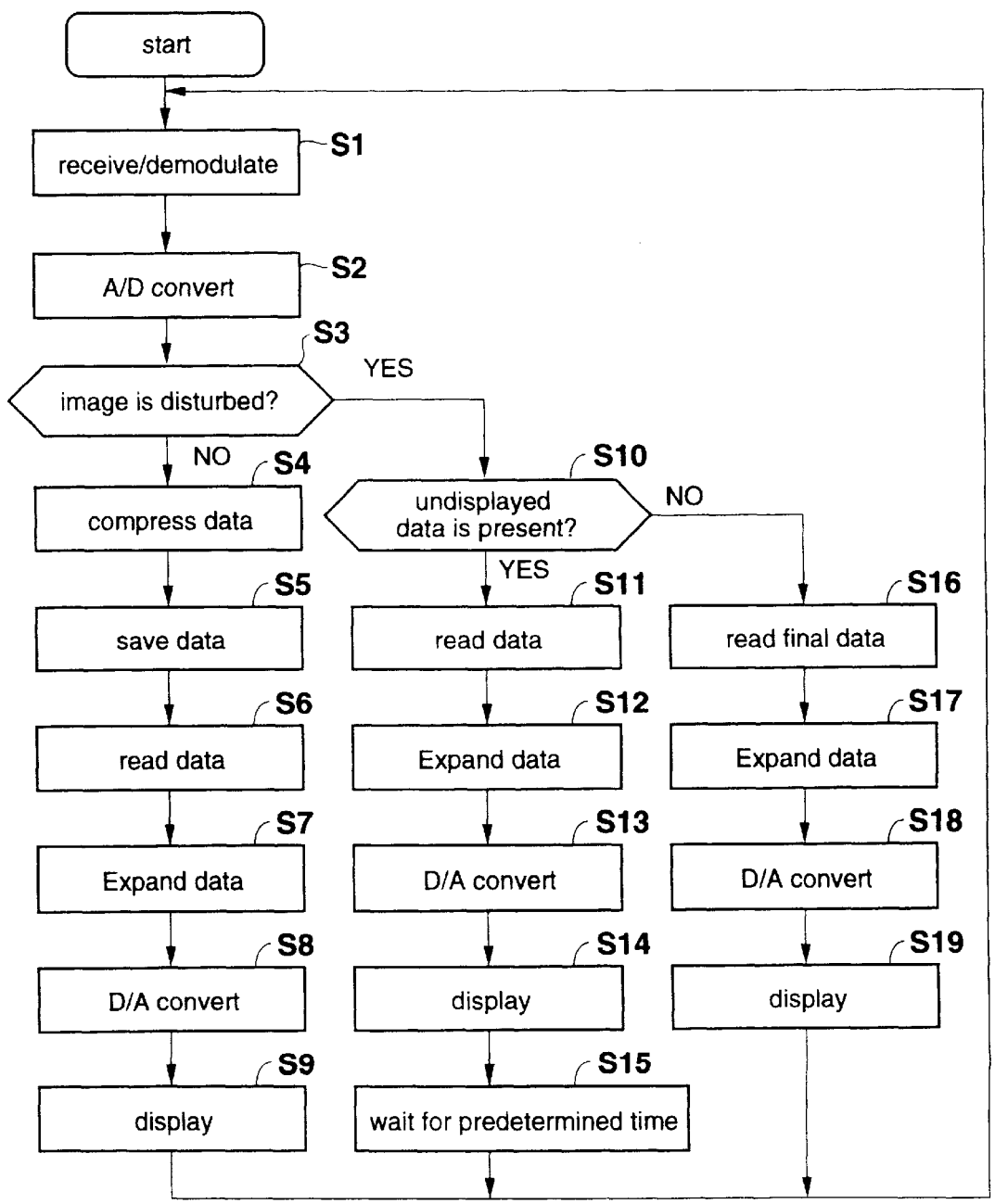
FIG. 3 is a flow chart for describing operations of the image control apparatus of FIG. 2.

Referring now to a flow chart of FIG. 3, operations of the image control apparatus according to the first embodiment will be explained.

At a first step S1, after the electromagnetic waves received via the receiver antenna 2 are demodulated, the RF demodulating circuit 21 outputs the demodulated signal to the A/D converter 22.

Next, at a step S2, the A/D converter 22 converts the demodulated analog signal into the digital video signal and supplies this digital video signal to the compressing/expanding circuit 23 and the microprocessor 24.

At a step S3, the microprocessor 24 extracts the image data from this digital video signal to calculate the correlation coefficient of the pixel values of the adjoining lines, and then judges as to whether or not the value of this correlation coefficient is larger than, or equal to a predetermined value. When the value of the correlation coefficient is substantially equal to 1, or −1, since the correlation can be recognized between these lines, the microprocessor 24 can judge that the image is not disturbed as to these lines.

When the quantity of lines whose correlation coefficient value is not larger than, or equal to a predetermined threshold, is smaller than a predetermined number within one screen, the microcomputer 24 judges that the image is not disturbed. In this case, the compressing/expanding circuit 23 continuously compresses the digital video signal at a step S4, and sequentially saves the compressed digital video signal into the storage apparatus 25 at a step S5.

Then, the compressing/expanding circuit 23 reads the data which has been saved in the storage apparatus for predetermined time at a step S6, and expands this read data, and thereafter outputs the expanded data to the encoder 26 at a step S7.

At a step S8, the encoder 26 D/A converts the data supplied from the compressing/expanding circuit 23 into the NTSC type analog video signal. Then, the encoder 26 outputs this NTSC type analog video signal to the TV 3 so as to be displayed thereon.

As described above, when there is no image disturbance, the received signal is converted into the digital video signal, and after this digital video signal is compressed, the compressed digital video signal is saved in the storage apparatus 25. Then, when a predetermined time period has passed, this saved digital video signal is read out from the storage apparatus 25. After the read video signal has been expanded, the expanded digital video signal is converted into the original analog video signal which will then be displayed on the TV 3.

Next, at the step S3, in such a case that the number of lines whose correlation coefficient value is not larger than, or equal to a predetermined threshold value, is greater than, or equal to a preselected number within one screen, the microprocessor 24 judges that the image is disturbed. Then, the microprocessor 24 instructs the compressing/expanding circuit 23 to interrupt the compressing and saving operations thereby of the digital video signal. The process operation is advanced to a step S10.

At the step S10, the compressing/expanding circuit 23 checks as to whether or not the data which has not yet been displayed is still saved in the storage apparatus 25. When there is such "not-yet-displayed" data, the process operation is advanced to a step S11 at which this "not-yet-displayed" data is read. At a further step S12, after this data is expanded into the original digital video signal, the expanded original digital video signal is outputted to the encoder 26.

Then, at a step S13, the encoder 26 converts the digital video signal supplied from the compressing/expanding circuit 23 into the NTSC type analog video signal. Thereafter, this NTSC type analog video signal is outputted from the encoder 26 to the TV 3 on which the picture of this video signal is displayed at a step S14.

After the picture is displayed, the compressing/expanding circuit 23 is brought into the waiting state for a predetermined time period at a step S15. After the compressing/expanding circuit 23 has been brought into the waiting state for a predetermined time period, the process operation is returned to the step S1.

As explained above, since the compressing/expanding circuit 23 is brought into the waiting state for a preselected time period, the picture display speed is delayed (as a "slow motion picture") and the picture display operation is continued, so that even under poor signal receiving conditions, the picture can be displayed without giving unpleasant or uncomfortable feelings to users.

When the compressing/expanding circuit 23 judges at the step S10 that there is no "not-yet-displayed" data, the process operation is advanced to a step S16 at which the finally displayed data is read. Then, at a step S17, this finally displayed data is expanded to the original digital video signal, and thereafter the expanded original digital video signal is outputted to the encoder 26. Then, at a step S18, the encoder 26 converts this encoded digital video signal into the NTSC type analog video signal. This NTSC type analog video signal is supplied to the TV3 so as to display the picture of this video signal thereon at a step S19.

As described above, when there is no undisplayed data under such a poor signal receiving condition, the picture of the finally displayed data is repeatedly displayed (as the "still picture") until the image disturbance disappears.

It should be understood that when all of the saved data are displayed, the final image is continuously displayed as the still image in this first embodiment. Alternatively, the saved data may be again displayed from the first data.

Figure 4:
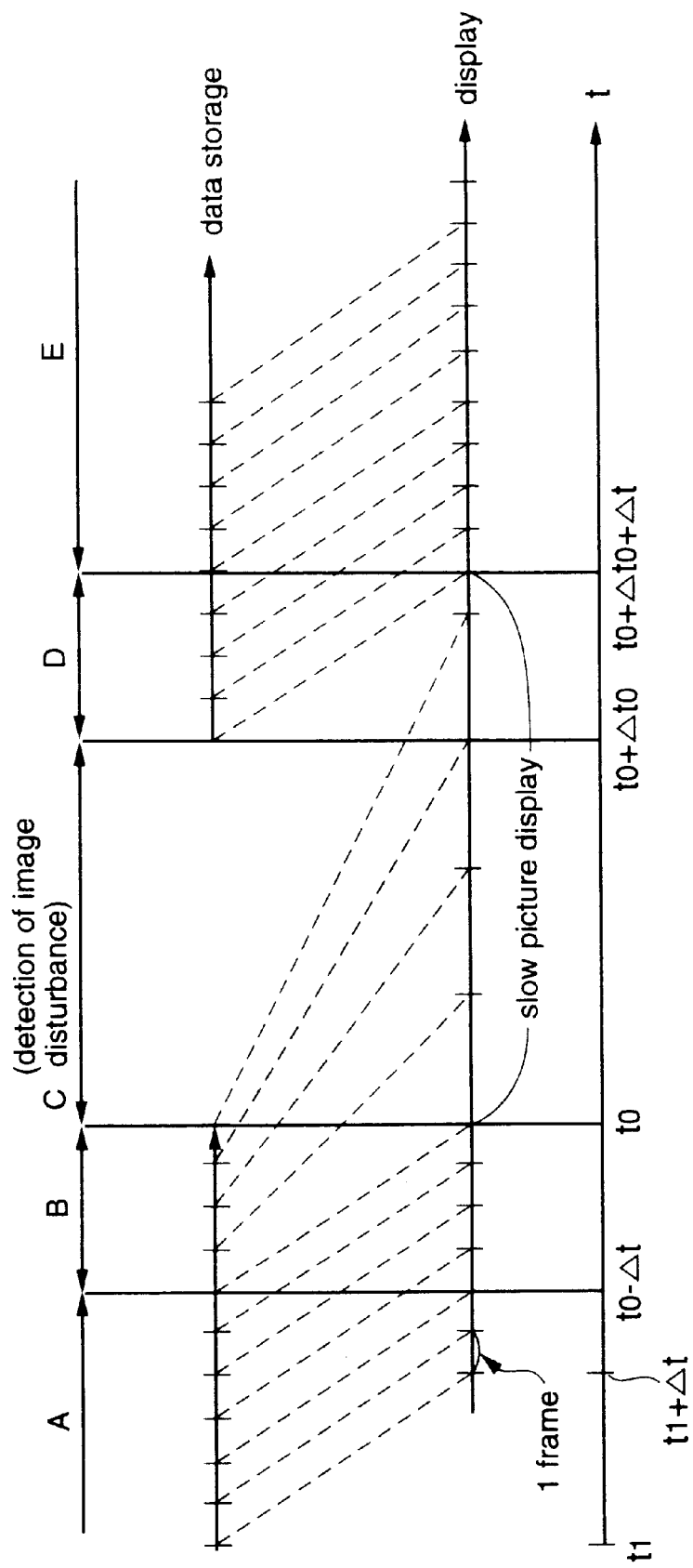
FIG. 4 is a timing chart for explaining operations of the image control apparatus of FIG. 2.

FIG. 4 is a timing chart for explaining the data storage operation and the image display operation executed in the first embodiment.

In the first embodiment, when the normal display is carried out (section A and section B), the compressing/expanding circuit 23 compresses the data supplied from the A/D converter 22, and thereafter saves the compressed data into the storage apparatus 25. Then, after a predetermined time "Δt" has elapsed, the compressing/expanding circuit 23 reads this compressed data, and then expands the read compressed data. Thereafter, the expanded data is encoded by the encoder 26 and the picture of this encoded data is displayed on the TV3. For instance, in FIG. 4, the image (1 frame) of the data saved at a time instant "$t_1$" is displayed at a time instant "$t_1+\Delta t$".

Now, such a judgment is made at a time instant "$t_0$" that the image is disturbed, the compressing/expanding circuit 23 interrupts the data storage operation, and reads such data saved in the storage apparatus 25 at this time instant "$t_0-\Delta t$" up to time instant "$t_0$") at a time internal longer than the normal time internal, and then displays the image of this saved data in a slow mode (section C and section D). In FIG. 4, the display time of 1 frame during the section C and the section D becomes three times longer than the normal display time (section A and section B).

Then, when it is judged that the image disturbance disappears (time instant "$t_0+\Delta t_0$"), although the image expanding circuit 23 restarts to save the received data into the storage apparatus 25, the slow image display operation is continued (section D) until a predetermined amount of data are saved (time Δt).

After the time Δt has passed since the judgment has been made of "no image disturbance" (section E), the normal image display is made in a similar manner to that of the section A and the section B.

Accordingly, when the image disturbance happens to occur, the slow picture display operation is carried out by utilizing the data saved at the time Δt (section B) before the image disturbance is detected during such a time period (section C: time $\Delta t_0$) where the image is disturbed, and at the subsequent time Δt (section D).

It should be noted that since a period of time $\Delta t_0$ during which the image disturbance is continued cannot be predicted, it may be short of image data when the display speed of the slow picture display becomes high. In this case, the finally displayed image during the slow image display operation is continuously displayed as the still image until a predetermined time Δt has passed after the image disturbance disappears.

When the display speed of the slow image display operation becomes low, the image disturbance may disappear before all of the same image data are displayed, and then a predetermined time Δt will elapse. In such a case, the slow image display operation is interrupted and the normal image display operation is commenced.

Figure 5:
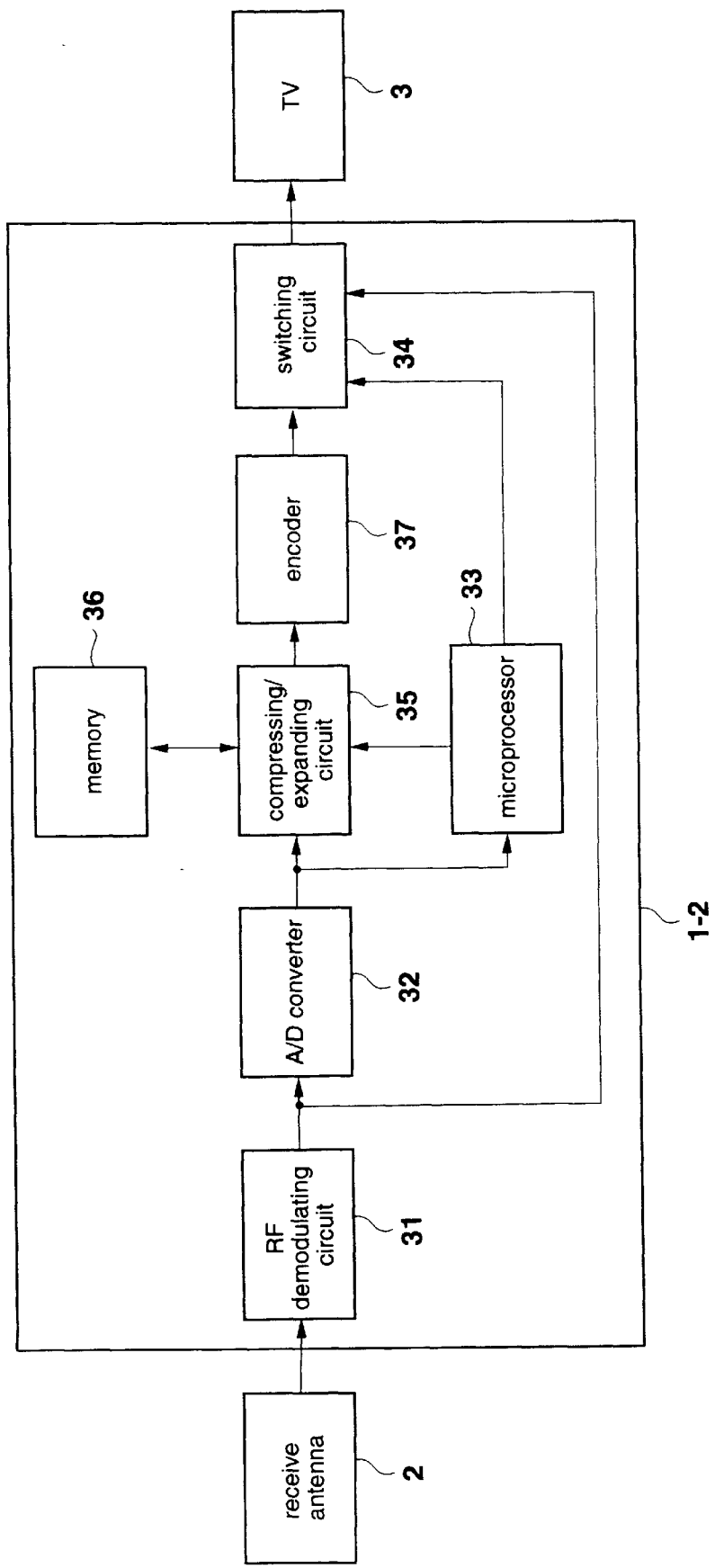
FIG. 5 is a schematic block diagram for indicating an arrangement of an image control apparatus according to a second embodiment of the present invention.

FIG. 5 schematically indicates an arrangement of an image control apparatus according to a second embodiment of the present invention. In this second embodiment, an RF (Radio Frequency) demodulating circuit (receiving means) 31 demodulates electromagnetic waves received via a receiver antenna 2 and outputs the demodulated signal (analog video signal) to an A/D converter 32, and a switching circuit 34.

The A/D converter 32 A/D-converts the analog video signal derived from the RF demodulating circuit 31 into a digital video signal, and then supplies this digital video signal to a compressing/expanding circuit (display control means) 35 and a microprocessor (detecting means) 33.

The compressing/expanding circuit 35 compresses the digital video signal containing image data and audio (voice) data, derived from the A/D converter 32, and thereafter saves the compressed digital video signal into a memory (saving means) 36. Then, the compressing/expanding circuit 35 reads the data from the memory 36 when a predetermined signal is supplied from the microprocessor 33 thereto, and then expands this read data. Thereafter, the compressing/expanding circuit 35 outputs the expanded data to an encoder 37.

The encoder 37 converts the digital video signal derived from the compressing/expanding circuit 35 into an NTSC type analog video signal which will then be outputted to the switching circuit 34.

The microprocessor 33 extracts image data from the digital video signal supplied from the A/D converter 32 and calculates a correlation coefficient of pixel values contained in the image data in one line and another line subsequent to the first-mentioned line. When a quantity of lines whose correlation coefficient value is not larger than, or equal to a predetermined threshold value is greater than, or equal to a predetermined number within one screen, the microprocessor 33 judges that this image is disturbed.

In the case that the microprocessor 33 judges that the image is disturbed, a signal responding to this judgment is supplied to the compressing/expanding circuit 35 and the switching circuit 34.

When the signal corresponding to the image disturbance is supplied to the switching circuit 34, this switching circuit 34 outputs the analog video signal derived from the encoder 37 to the TV3, whereas when such a signal is not supplied thereto, this switching circuit 34 outputs the analog video signal derived from the RF demodulating circuit 31 to the TV3.

Figure 6:
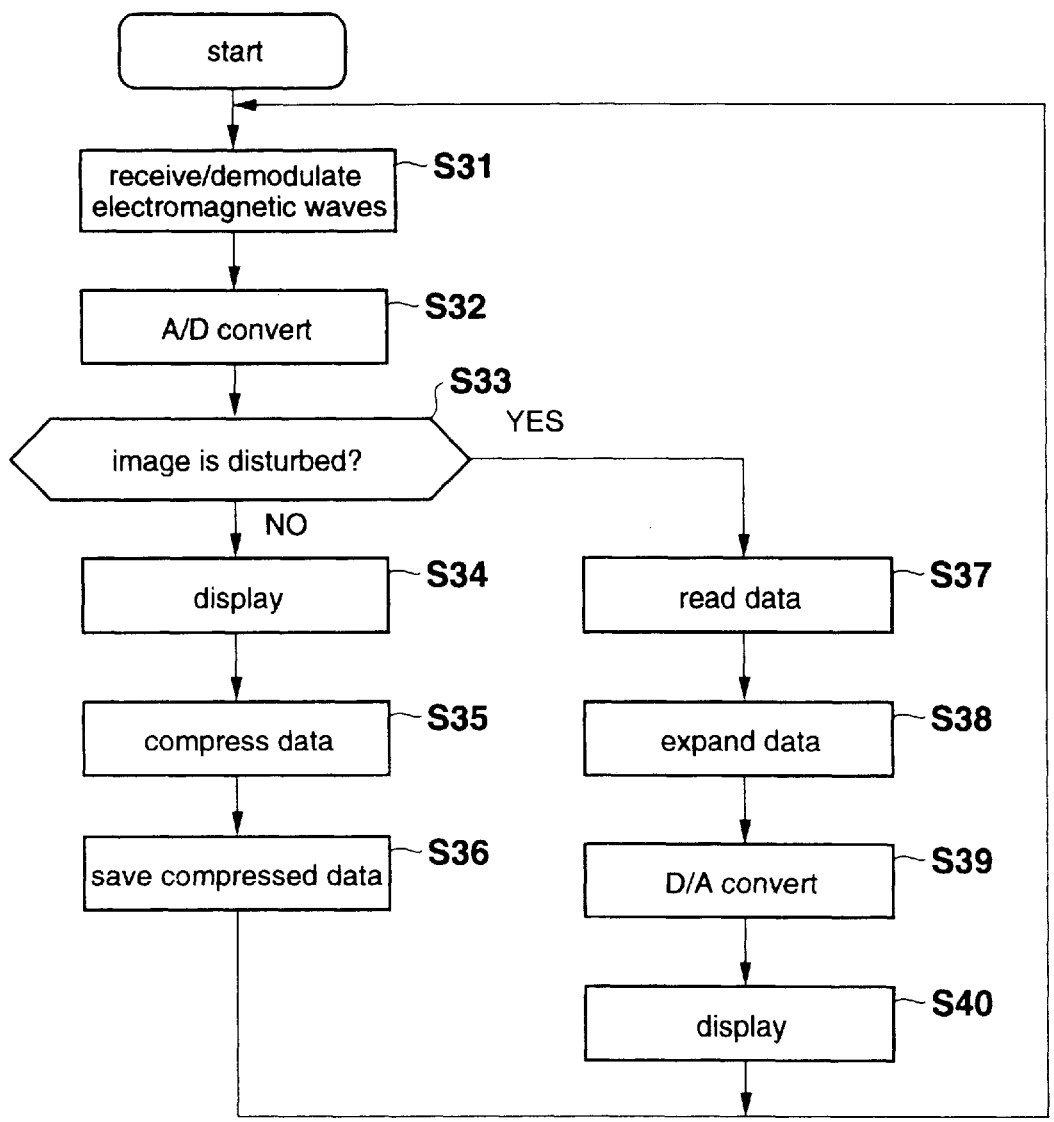
FIG. 6 is a flow chart for describing operations of the image control apparatus according to the second embodiment.

Referring now to a flow chart of FIG. 6, operations of the image control apparatus according to the second embodiment will be explained.

At a first step S31, after the electromagnetic waves received via the receiver antenna 2 are demodulated, the RF demodulating circuit 31 outputs the demodulated signal to the A/D converter 32.

Next, at a step S32, the A/D converter 32 converts the analog video signal supplied from the RF demodulating circuit 31 into the digital video signal and outputs this digital video signal to the compressing/expanding circuit 35 and the microprocessor 33.

At a step S33, the microprocessor 33 extracts the image data from this digital video signal to calculate the correlation coefficient of the pixel values of the adjoining lines, and then judges as to whether or not the value of this correlation coefficient is larger than, or equal to a predetermined value.

When the quantity of lines whose correlation coefficient value is not larger than, or equal to a predetermined threshold, is smaller than a predetermined number within one screen, the microcomputer 33 judges that the image is not disturbed. In this case, the microprocessor 33 instructs the switching circuit 34 to output the analog video signal derived from the RF demodulating circuit 31 to the TV3, and at a step S34, directly displays the image of the received signal on the TV3.

The microprocessor 33 directly displays the image of the received signal on the TV3, and thereafter instructs the compressing/expanding circuit 35 to compress the digital video signal supplied from the A/D converter 32 at a step S35. At a step S36, the microprocessor 33 stores the compressed data into the memory 36.

It should be noted that since the compressed data is overwritten on the memory 36 every frame, the memory 36 may merely have a memory capacity capable of storing compressed data for one frame. That is, it is possible to employ such a RAM having a relatively smaller capacity than that of a hard disk.

Subsequently, when the image disturbance is detected at a step S33, the compressing/expanding circuit 35 reads the data from the memory 36 at a step S37, and expands this read data to be outputted to the encoder 37 at a step S38.

At a step S39, the encoder 37 encodes the digital video signal supplied from the compressing/expanding circuit 35 to produce the NTSC type analog video signal which will then be outputted to the switching circuit 34.

At a step S40, the microprocessor 33 instructs the switching circuit 34 to output the analog video signal derived from the encoder 27 to the TV3, and therefore the image of this signal is displayed on the TV3.

As explained above, when there is no disturbance in the image, the received signal is directly outputted to the TV3, whereas when there is disturbance in the image, since new data is not saved in the memory 36, the image of the data last stored in the memory 36 is repeatedly displayed as a "still image".

It should also be noted that when the image disturbance is detected in the above-explained first and second embodiments, the correlation coefficient of the pixel values of the adjoining lines in one screen of the digital image is calculated and then the image disturbance is judged based upon this calculated value of the correlation coefficient. Alternatively, a correlation coefficient between a pixel value of a certain pixel in the present frame and a pixel value of a corresponding pixel in a preceding frame is calculated, and then when this calculated value is smaller than a predetermined value, it may be possible to judge that the image is disturbed.

Further, the digital image is not utilized, but the vertical sync signal, the horizontal sync signal, and the color burst signal contained in the demodulated analog video signal are monitored. When these signals are disturbed, it may be judged that the image is disturbed.

Figure 7:
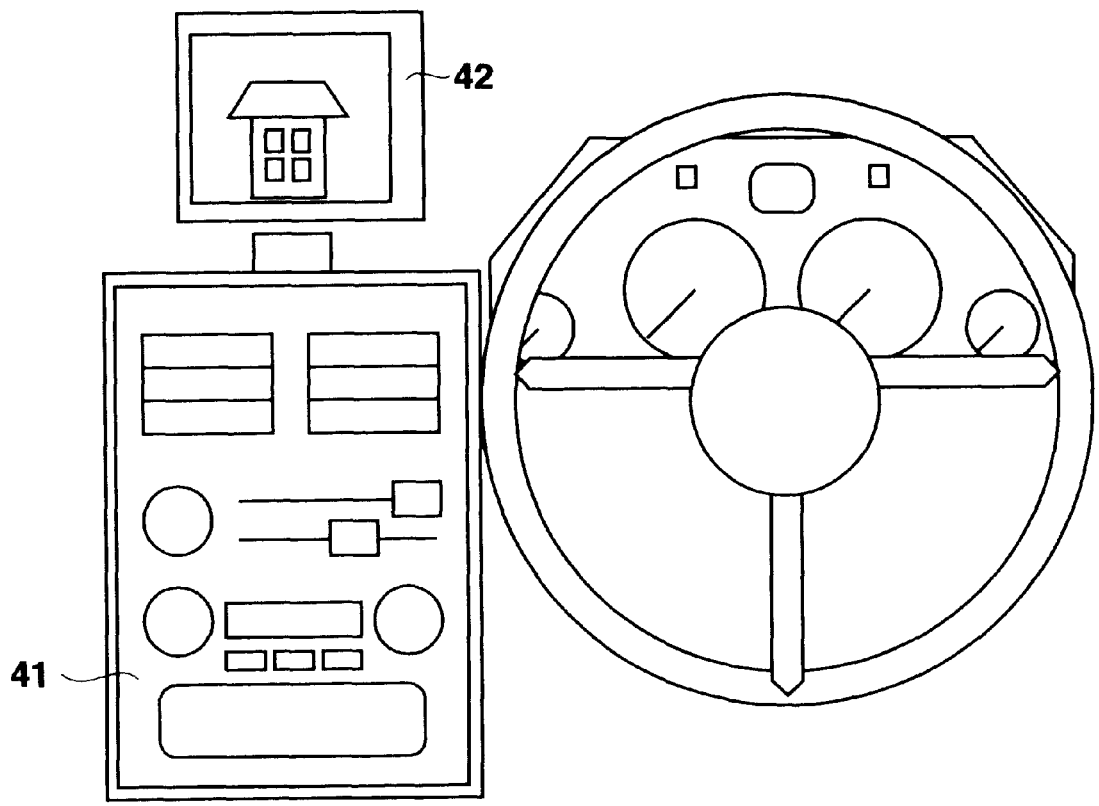
FIG. 7 schematically illustrates an example of an on-vehicle type television.

FIG. 7 schematically illustrates one example of an on-vehicle type television (a so-called "car TV") to which the second embodiment is applied. In this car TV, when user manipulates an operation panel 41 so as to receive a television broadcasting signal, a picture of this received TV broadcasting signal is displayed on a CRT (cathode-ray tube) 42.

Figure 8:
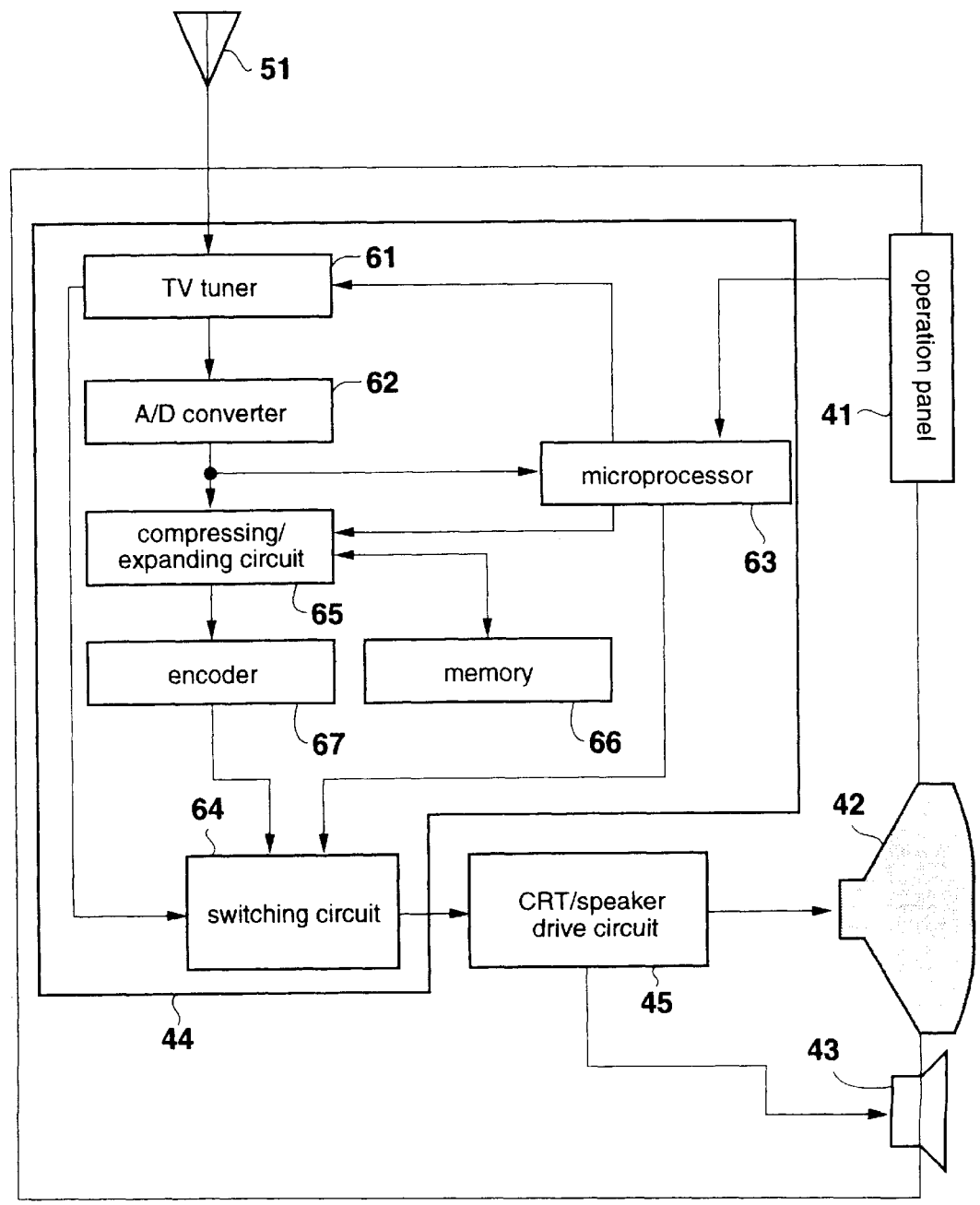
FIG. 8 is a schematic block diagram for showing an internal circuit arrangement of an on-vehicle type television to which the embodiment of FIG. 5 is applied.

FIG. 8 shows an internal arrangement of the car TV indicated in FIG. 7. In this car TV, the operation panel 41 supplies a signal corresponding to the operations by the user to a microprocessor 63.

In response to signal derived from the microprocessor 63, a TV tuner (receiving means) receives a preselected TV channel program signal via an antenna, and demodulates this TV channel program signal, and thereafter supplies the demodulated program signal to an A/D converter 62 and a switching circuit 64.

It should be noted that since this A/D converter 62 through an encoder 67 are arranged similar to the above-described A/D converter 32 through the encoder 37 employed in the second embodiment, explanations thereof are omitted.

A CRT and speaker drive circuit 45 separate the analog video signal supplied from the switching circuit 64 into a picture (video) signal and an audio (voice) signal, and thereafter outputs the picture signal to the CRT 42 and the audio signal to a speaker 43.

It should be noted that since operation of this car TV is substantially similar to that of the second embodiment, explanations thereof are omitted.

It should also be noted that although the second embodiment is applied to the image control apparatus 44 in this car TV, the first embodiment may be alternatively applied thereto.

Figure 9:
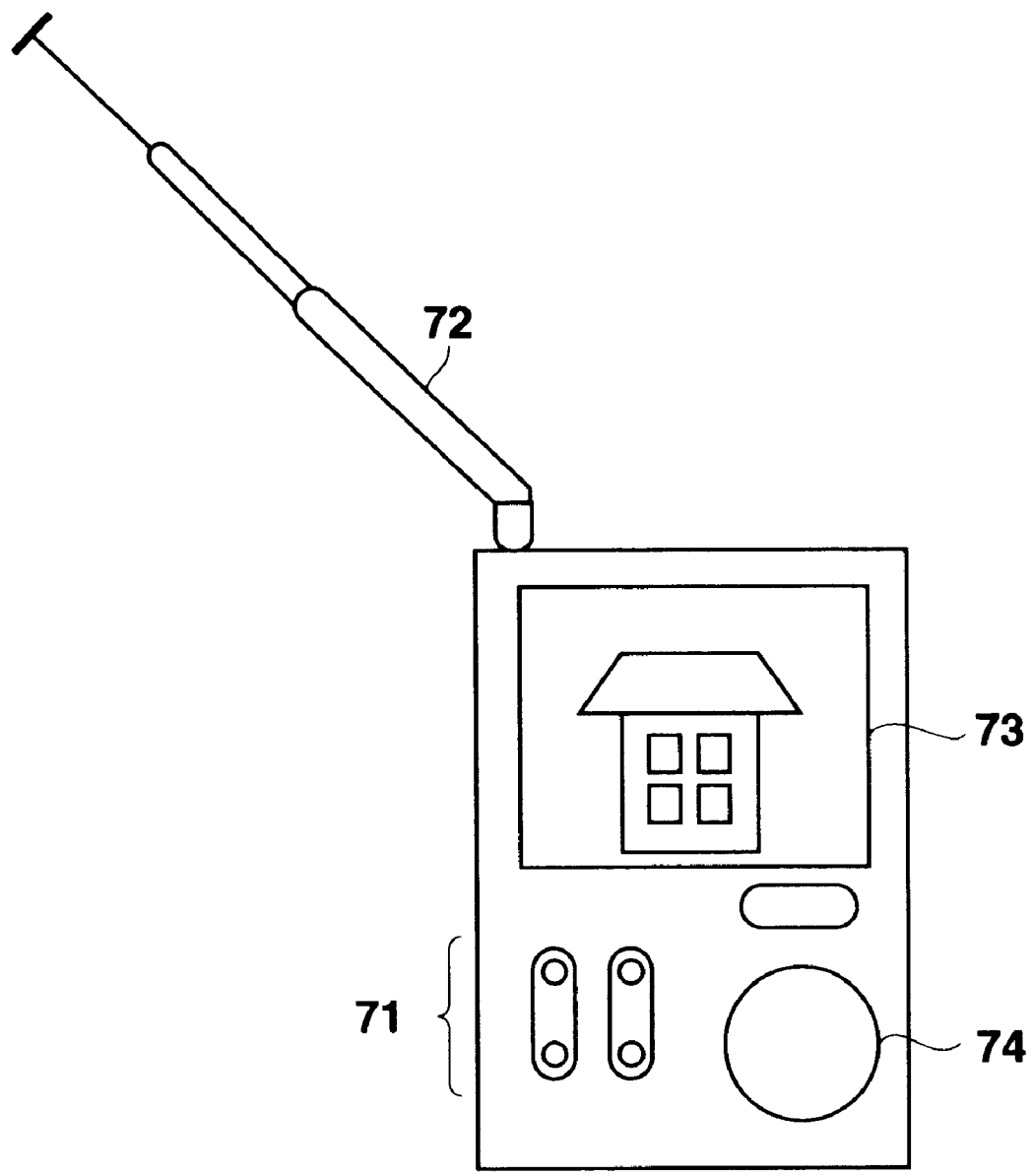
FIG. 9 schematically illustrates an example of a portable type television to which the image control apparatus of the present invention is applied.

As an application example other than the car TV, FIG. 9 schematically represents such an example that the image control apparatus according to the embodiment of the present invention is applied to a portable TV. Similar to the car TV, in this portable Tv, when a channel is selected by the operation panel 71, a TV program signal of this selected channel is received via an antenna 72, and then a picture is displayed in a CRT 73 and voice is outputted from a speaker 73. Then, when the signal reception condition is deteriorated, a predetermined saved picture is displayed on the CRT 73, so that no poor pictures are displayed on the screen.

Figure 10:
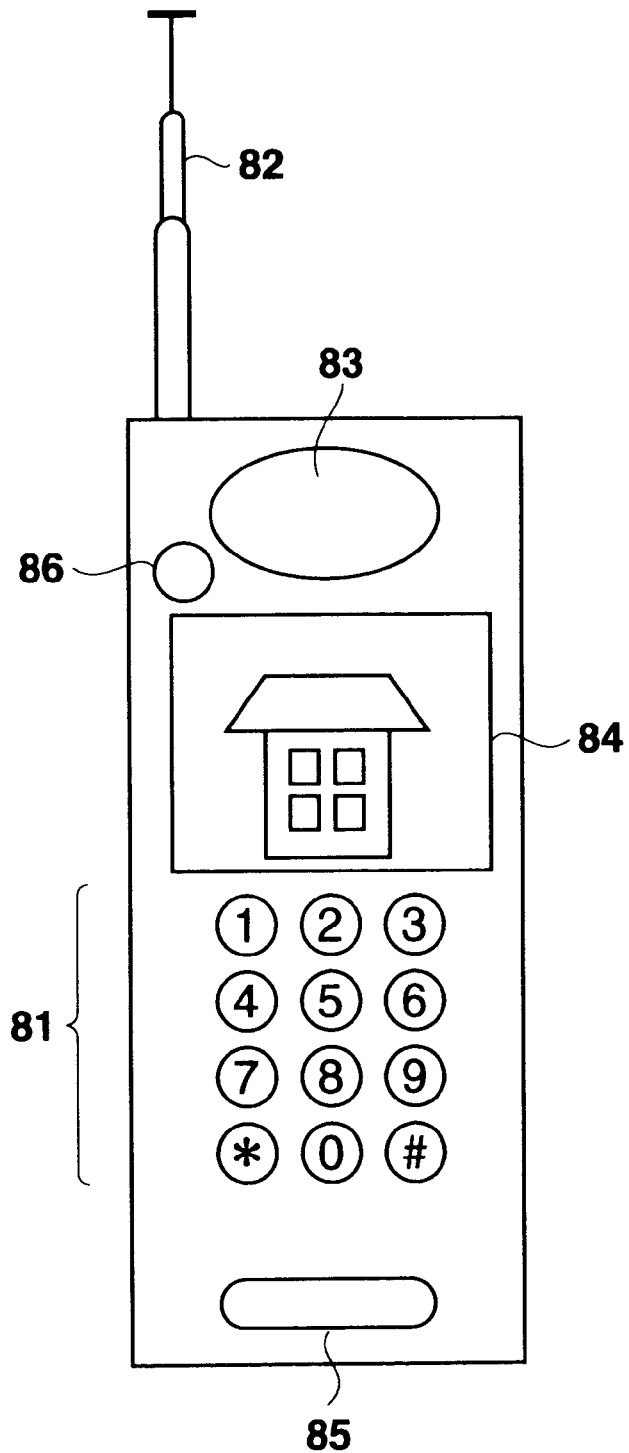
FIG. 10 schematically illustrates an example of a portable TV/telephone apparatus to which the image control apparatus of the present invention is applied.

FIG. 10 schematically represents an example of a portable TV/telephone apparatus to which the image control apparatus according to the embodiment of the present invention is applied. This portable TV/telephone apparatus may transmit and receive predetermined electromagnetic waves through an antenna 82.

In this portable TV/telephone apparatus, a picture is displayed on a CRT 84 and voice is outputted from a speaker 83 when a TV program signal is received via the antenna 82. Then, both voice detected by a microphone 85 and an image sensed by a CCD video camera 86 are transmitted via this antenna 82.

When signal reception conditions are deteriorated, a preselected saved picture is displayed on the CRT 84, so that no poor pictures are displayed on the screen.

As described above, in accordance with the image control apparatus according to the first aspect of the present invention and the image control method according to the fifth aspect of the present invention, when a detection is made of disturbance in the received signal, the saved image data is displayed at a preselected speed while the signal disturbance is continued. As a consequence, the picture display can be continued by giving substantially no unpleasant feelings to the user in such a case that the signal reception condition is deteriorated in a short time period.

What is claimed is:

1. An image control apparatus for use with a display unit comprising:
   receiving means for receiving a signal including image data;
   detecting means for detecting a disturbance of said signal received by said receiving means;
   saving means for saving said image data included in said signal received by said receiving means; and
   display control means for controlling a display of said image data on the display unit so that said image data saved in said saving means is read out when said detecting means detects said disturbance of said signal and is displayed while said disturbance of said signal continues, wherein said display control means controls the display of said image data on the display unit so that, when all of said image data saved in said saving means have been read out and displayed, said image data saved in said saving means is read out from said image data again and is displayed while said disturbance of said signal continues.

2. The image control apparatus as claimed in claim 1, wherein said display control means controls the display of said image data so that said image data is compressed when said image data is saved in said saving means and said compressed image data is expanded when said image data is read out from said saving means.

3. The image control apparatus as claimed in claim 1, wherein said image control apparatus is incorporated in a car television.

4. The image control apparatus as claimed in claim 1, wherein said image control apparatus is incorporated in a portable television.

5. An image control apparatus for use with a display unit comprising:
   receiving means for receiving a signal including image data;
   detecting means for detecting a disturbance of said signal received by said receiving means;
   saving means for saving said image data included in said signal received by said receiving means; and
   display control means for controlling a display of said image data on the display unit so that said image data saved in said saving means is read out when said detecting means detects said disturbance of said signal and is displayed while said disturbance of said signal continues, wherein said display control means controls the display of said image data on the display unit so that, when all of said image data saved in said saving means have been read out and displayed, a predetermined image data saved in said saving means is read out and displayed as a still image while said disturbance of said signal continues.

6. The image control apparatus as claimed in claim 5, wherein said display control means controls the display of said image data so that said image data is compressed when said image data is saved in said saving means and said compressed image data is expanded when said image data is read out from said saving means.

7. An image control method comprising the steps of:
   receiving a signal including image data;
   sequentially saving said image data included in said signal received;
   sequentially reading out said image data after a predetermined time has passed and a disturbance of said received signal has been detected; and
   displaying said image data, said step of displaying being controlled so that, when said disturbance of said signal is detected, said image data saved is read out and displayed at a predetermined displaying speed while said disturbance of said signal continues, wherein said step of displaying is carried out so that, when all of said saved image data have been read out and displayed, said saved image data is read out again and is displayed while said disturbance of said signal continues.

8. The image control method as claimed in claim 6, wherein said step of displaying is carried out so that said image data are compressed when said image data is saved and said compressed image data is expanded when said image data is read out.

9. An image control method comprising the steps of:
   receiving a signal including image data;
   sequentially saving said image data included in said signal received;
   sequentially reading out said image data after a predetermined time has passed and a disturbance of said received signal has been detected; and
   displaying said image data, said step of displaying being controlled so that, when said disturbance of said signal is detected, said image data saved is read out and displayed at a predetermined displaying speed while said disturbance of said signal continues, wherein said step of displaying is carried out so that, when all of said saved image data have been read out and displayed, a predetermined saved image data is read out and displayed as a still image while said disturbance of said signal continues.

10. The image control method as claimed in claim 9, wherein said step of displaying is carried out so that said image data are compressed when said image data is saved and said compressed image data is expanded when said image data is read out.

11. An image control system for use with a display unit comprising:
   transmitting means for transmitting a signal including image data;
   receiving means for receiving said signal transmitted from said transmitting means;

detecting means for detecting a disturbance of said signal received by said receiving means;

saving means for saving said image data included in said signal received by said receiving means; and display control means for controlling a display of said image data on the display unit so that said image data saved in said saving means is read out upon said detecting means detecting said disturbance of said signal and said saved image data is displayed while said disturbance of said signal continues, wherein said display control means controls the display of said image data on the display unit so that, when all of said image data saved in said saving means have been read out and displayed, said saved image data is read out again and is displayed while said disturbance of said signal continues.

12. The image control system as claimed in claim 11, wherein said signal is transmitted in a form of an electromagnetic wave.

13. The image control system as claimed in claim 11, wherein said signal is transmitted in a form of an infrared ray.

14. The image control system as claimed in claim 12, wherein said display control means controls the display of said image data so that said image data is compressed when said image data is saved in said saving means and said compressed image data is extended when said image data is read out from said saving means.

15. An image control system for use with a display unit comprising:

transmitting means for transmitting a signal including image data;

receiving means for receiving said signal transmitted from said transmitting means;

detecting means for detecting a disturbance of said signal received by said receiving means;

saving means for saving said image data included in said signal received by said receiving means; and display control means for controlling a display of said image data on the display unit so that said image data saved in said saving means is read out upon said detecting means detecting said disturbance of said signal and said saved image data is displayed while said disturbance of said signal continues, wherein said display control means controls the display of said image data on the display unit so that, when all of said image data saved in said saving means have been read out and displayed, a predetermined image data saved in said saving means is read out and displayed as a still image while said disturbance of said signal continues.

16. The image control system as claimed in claim 15, wherein said display control means controls the display of said image data so that said image data is compressed when said image data is saved in said saving means and said compressed image data is expanded when said image data is read out from said saving means.

* * * * *